United States Patent
Joo

(10) Patent No.: US 6,868,118 B2
(45) Date of Patent: Mar. 15, 2005

(54) DISCRETE MULTI-TONE PROCESSOR IN ASYMMETRIC DIGITAL SUBSCRIBER LINE MODEM

(75) Inventor: Jin-tae Joo, Suwon (KR)

(73) Assignee: Samsung Electronics Co., Ltd. (KR)

(*) Notice: Subject to any disclaimer, the term of this patent is extended or adjusted under 35 U.S.C. 154(b) by 810 days.

(21) Appl. No.: 09/794,800

(22) Filed: Feb. 27, 2001

(65) Prior Publication Data

US 2001/0022810 A1 Sep. 20, 2001

(30) Foreign Application Priority Data

Mar. 16, 2000 (KR) ........................................ 2000-13349

(51) Int. Cl.[7] ............................................... H04B 1/38
(52) U.S. Cl. ...................................................... 375/222
(58) Field of Search ................................ 375/222, 259, 375/260, 261, 340, 354, 362, 219, 295, 316; 370/482, 485, 503, 525, 526, 208, 210, 509; 379/93.01, 93.06, 93.05, 399.01, 399.02

(56) References Cited

U.S. PATENT DOCUMENTS

| | | | | |
|---|---|---|---|---|
| 5,625,651 A | * | 4/1997 | Cioffi ........................... | 375/354 |
| 5,751,741 A | * | 5/1998 | Voith et al. ................... | 714/758 |
| 6,208,637 B1 | * | 3/2001 | Eames ......................... | 370/352 |
| 6,272,209 B1 | * | 8/2001 | Bridger et al. ............ | 379/27.01 |
| 6,377,683 B1 | * | 4/2002 | Dobson et al. ........ | 379/406.12 |
| 6,721,356 B1 | * | 4/2004 | Cole et al. ................... | 375/222 |

OTHER PUBLICATIONS

Wu, et al., "A Fast Algorithm for Reduced–Complexity Programmable DSP Implementation of the IFFT/FFT in DMT Systems", Globecom 98 vol. 2, p.p. 833–838 (Nov. 8–12, 1998).

* cited by examiner

*Primary Examiner*—Tesfaldet Booure
*Assistant Examiner*—Khanh Cong Tran
(74) *Attorney, Agent, or Firm*—Mills & Onello LLP

(57) ABSTRACT

A discrete multi-tone (DMT) processor receives predetermined control signals from a digital signal processor (DSP) within an asymmetric digital subscriber line (ADSL) modem, modulates transmission data in response to the control signals, and demodulates reception data. The DMT processor includes a frame synchronization signal generator, a transmitter, and a receiver. The frame synchronization generator generates a transmission frame synchronization signal and a reception frame synchronization signal in response to a cyclic prefix contained in the transmission data or reception data and a reception synchronization shift signal applied from the DSP. The transmitter DMT modulates and gain-controls the transmission data input in response to the transmission frame synchronization signal The receiver gain-controls and DMT demodulates the reception data response to the reception frame synchronization.

26 Claims, 6 Drawing Sheets

DISCRETE MULTI-TONE PROCESSOR IN ASYMMETRIC DIGITAL SUBSCRIBER LINE MODEM

BACKGROUND OF THE INVENTION

1. Field of the Invention

The present invention relates to an asymmetric digital subscriber line system, and, more particularly, to a discrete multi-tone processor in an asymmetric digital subscriber line (ADSL) modem.

2. Description of the Related Art

Recently, as internet and data compression technologies progress, not only can simple text information be available over a network, but also audio and moving image can be transmitted in real time. Furthermore, for transmission of a significant amount of information, new communications media such as integrated services digital network (ISDN) or cable modems have been developed. ISDN allows for simultaneous use of data communications and telephone service, but reduces data communication speed by half. Cable modems are relatively costly for both installation and use.

In order to compensate for such drawbacks, the ADSL system has been proposed as the next generation technology. The ADSL system provides for high speed data communications using existing telephone lines. In other words, ADSL allows more data to be sent over an existing telephone line. ADSL supports data transfer rates up to 640 kilobytes per second (Kbps) when sending data and data rates up to 8 megabytes per second (Mbps) when receiving data from an exchange station. Since the exchange rate of data in data transmission and data reception is different, ADSL is referred to an asymmetric digital subscriber line.

A digital modem operable under the ADSL protocol, used for data transmission, is about 100 times faster than a conventional analog modem having data transfer rate of 56 Kbps. This means that a complicated internal algorithm is required in the ADSL system since there is a need to accurately receive and transmit a large quantity of data at high speed. Thus, the overall complexity of the system for realizing the complicated internal algorithm increases, as high-price and high-speed digital signal processors (DSP) are required by the ADSL system.

Furthermore, the balance of price and efficiency for an ADSL system becomes a challenging compromise. In order to reduce the price, the ADSL modem must have an optimum design in which hardware and software are appropriately divided. A conventional ADSL modem adopts a digital modulation/demodulation technique referred to as discrete multi-tone (DMT). The DMT modulation/demodulation method requires a large amount of repetitive computations, and the overall operation processing is conventionally performed by the DSP using software. Furthermore, a protocol signal for initializing an ADSL modem is produced by the DSP using software. Since performance of the DMT function and production of the protocol signal are performed in software, the conventional ADSL has the advantage of flexibility. However, in this case, a high-price and high-speed DSP operable at 100 million instructions per second (MIPS) or faster is required.

As a result, the conventional ADSL modem has a disadvantage in that the price of and the overall size of the modem are increased due to use of the high speed and high priced DSP. Furthermore, the conventional ADSL modem consumes more power.

SUMMARY OF THE INVENTION

To address the above limitations, it is an object of the present invention to provide a discrete multi-tone (DMT) processor operable for performing a DMT function separate from the need for a digital signal processor (DSP).

It is another object to provide a protocol signal generator which is provided in the DMT processor and generates a protocol signal using hardware.

Accordingly, to achieve the above objectives, the present invention provides a DMT processor that receives predetermined control signals from a DSP within an asymmetric digital subscriber line (ADSL) modem, modulates transmission data in response to the control signals, and demodulates reception data is provided. The DMT processor includes a frame synchronization signal generator, a transmitter, and a receiver. The frame synchronization generator generates a transmission frame synchronization signal and a reception frame synchronization signal in response to a cyclic prefix contained in the transmission data or reception data and a reception synchronization shift signal applied from the DSP. The transmitter DMT modulates and gain-controls the transmission data input through a first input terminal in response to the transmission frame synchronization signal and outputs the modulated and gain-controlled result through a first output terminal. The receiver gain-controls and DMT demodulates the reception data applied through a second input terminal in response to the reception frame synchronization signal and outputs the demodulated and gain-controlled result through a second output terminal.

The present invention also provides a protocol signal generator that generates a protocol signal for initializing the modem in response to a predetermined command applied from the DSP in a DMT processor that discrete multi-tone modulates/demodulates transmission and reception data by control of the DSP provided within an ADSL modem. The protocol signal generator includes a random sequence generator, a bit slicer, a tone generator, a multiplexer, and a quadrature amplitude modulation (QAM) signal generator. The random sequence generator generates a random sequence transmitted through a plurality of sub-channels in response to the command. The bit slicer slices the random sequence in units of a predetermined number of bits and outputs the sliced bits. The tone generator generates a predetermined tone signal transmitted through a designated sub-channel in response to the command. The multiplexer receives the sliced bit signal and the tone signal and selectively outputs one of the received signals. The QAM signal generator performs QAM encoding on the output signal of the multiplexer and outputs the encoded result as the protocol signal.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF PREFERRED EMBODIMENTS

Figure 1:
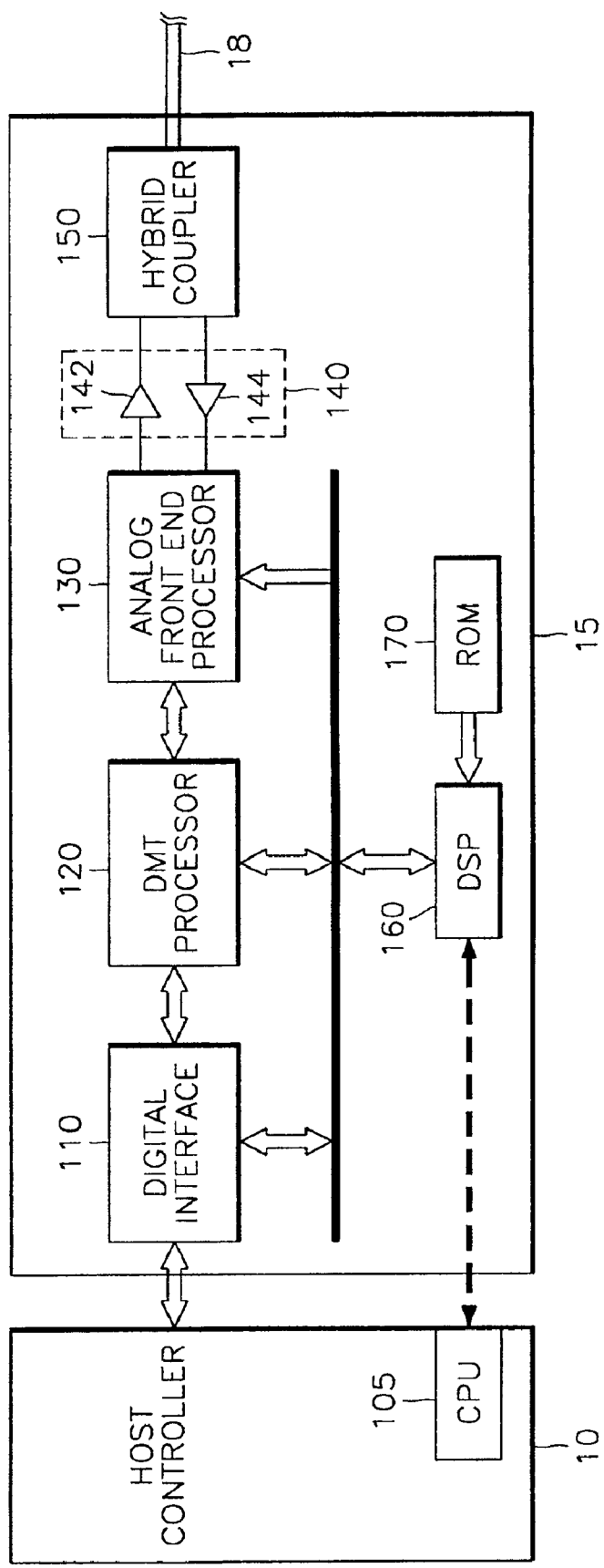
FIG. 1 is a block diagram of an asymmetric digital subscriber line (ADSL) modem in which a discrete multi-tone (DMT) processor according to an embodiment of the present invention is applied.

Referring to FIG. 1, which is a schematic block diagram for explaining an asymmetric digital subscriber line (ADSL) modem in which a discrete multi-tone processor according to the present invention is applied, an ADSL modem 15 includes a digital interface 110, a DMT processor 120, an analog front end processor 130, a line driver 140, a hybrid coupler 150, a digital signal processor (DSP), and a memory 170. For convenience of explanation, a host controller 10 is also shown in FIG. 1.

The host controller 10 in FIG. 1 is provided within a personal computer (PC) and transmits data using an asynchronous transfer mode (ATM) and a synchronous transfer mode (STM or non-ATM). Thus, the host controller 10 communicates with the DMT processor 120 through the digital interface 110 by the ATM, or a non-ATM, method. Furthermore, the host controller 10 in FIG. 1 may comprise a PC in the case of a subscriber's (hereinafter referred to "RT") modem, or may comprise a predetermined processor for controlling data transmission in the case of a telephone company central office's (hereinafter referred to "CO") modem. The host controller 10 in FIG. 1 includes a central processing unit (CPU) 105 through which it interfaces with the DSP 160 in the ADSL modem 15.

The digital interface 110 in the ADSL modem 15 shown in FIG. 1 serves as an interface so that data can be digitally transmitted to/received from the external host controller 10. In particular, the digital interface 110 processes data applied through the host controller 10 using a predetermined method and corrects any errors in the data. The DMT processor 120 modulates/demodulates data according to the DMT protocol, which is a digital modulation/demodulation protocol, so that data can be received and transmitted from the CO's modem to the RT's modem and vice versa. In this case, the DMT modulation/demodulation is performed by modulating points on which fast Fourier transform (FFT) is performed and demodulating the modulated signal for each sub-channel using a plurality of carriers. For example, quadrature amplitude modulation (QAM) can be used in the DMT method. In the DMT modulation/demodulation method, QAM is adopted differently for each sub-channel. For example, if a given channel condition is good, QAM modulation is performed on an increased number of points, while if the channel condition is bad, QAM modulation is performed on a reduced number of points. In addition to the fundamental modulation/demodulation function, the DMT processor 120 generates a protocol signal for initialization between modems, and produces a frame synchronization signal utilized that is as a reference signal for each of the processing blocks in the modem.

The analog front end processor 130 converts a digital signal output from the DMT processor 120 to an analog signal to a format suitable for transmission over a telephone line 18. In the opposite direction of data flow, the analog front end processor 130 further converts an analog signal received via the telephone line 18 into a digital signal for delivery to the DMT processor 120. Although not shown in detail, the analog front end processor 130 includes an analog-to-digital (A/D) converter, a digital-to-analog (D/A) converter, and a phase locked loop (PLL) for phase locking. The line driver 140 buffers an analog signal output from the analog front end processor 130 and outputs the buffered result, and further buffers an analog signal received through the telephone line 18 and transmits the buffered result to the analog front end processor 130. To this end, the line driver 140 includes a transmission buffer 142 for transmission, and a reception buffer 144 for reception.

The hybrid coupler 150 determines the direction of a signal in a two wire circuit or a four wire circuit and determines the direction of transmitting/receiving data through the telephone line 18. The DSP 160 interfaces with the digital interface 110 and the DMT processor 120 via the frame synchronization signal generated by the DMT processor 120. The DSP 160 further generates control signals for regulating modem initialization operation and each operation processed in the DMT processor 120. For example, the DSP 160 produces control signals for the operations of the DMT processor 120 such as modem initialization, timing control in data transmission/data reception, and generation of the frame synchronization signal, and transmits the control signals to the DMT processor 120. The memory 170 stores commands processed in the DSP 160, as well as execution programs, and is preferably implemented as a read only memory (ROM).

The ADSL modem 15 having the structure as described is primarily comprised of a digital unit and an analog unit. Referring to FIG. 1, the digital interface 110, DMT processor 120, the DSP 160, and the memory 170 are classified as the digital unit, while the analog front end processor 130, the line driver 140, and the hybrid coupler 150 are classified as the analog unit. In other words, the present invention realizes the dedicated DMT processor for processing modulation/demodulation functions which cause onerous computation and are cyclically repeated. Therefore, if the dedicated DMT processor is adopted in the ADSL modem as shown in FIG. 1, there is an advantage in that a DSP can be embodied as a small size and lower price chip. For example, there are many portions of a DSP chip that are not actually utilized, and in order to process the DMT function as described above, a high speed and high price DSP is required. As a result, the DMT processor 120 according to the present invention operates as a co-processor of the DSP 160.

Figure 2:
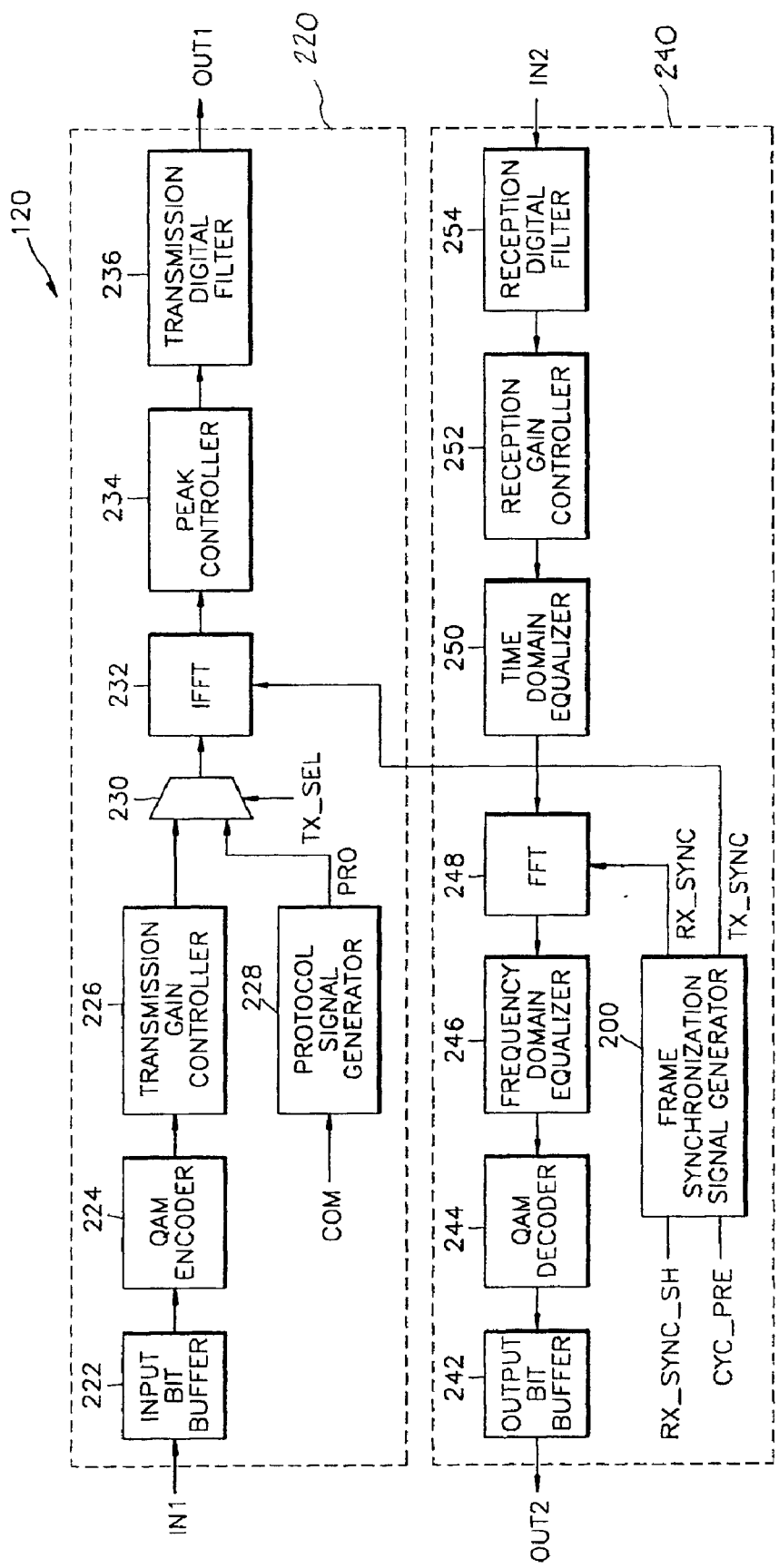
FIG. 2 is a block diagram showing the DMT processor according to the embodiment of the present invention.

FIG. 2 is a block diagram showing the DMT processor 120 according to an embodiment of the present invention. Referring to FIG. 2, the DMT processor 120 includes a frame synchronization signal generator 200, a transmitter 220, and a receiver 240. The frame synchronization signal generator 200 produces a transmission frame synchronization signal TX_SYNC and a reception frame synchronization signal RX_SYNC in response to a cyclic prefix CYC_PRE contained in transmitted or received data, and a reception synchronization shift signal RX_SYNC_SH applied from the DSP chip 160 (See FIG. 1). Here, the transmission frame synchronization signal TX_SYNC serves as a reference signal for operating internal blocks of the transmitter 220. In particular, the transmission frame synchronization signal TX_SYNC is applied to an inverse fast Fourier transform (IFFT) unit 232 of the transmitter 220 and utilized as the reference signal for operating the internal memory. Furthermore, the reception frame synchronization signal RX_SYNC is a reference signal for operating internal blocks of the receiver 240. In particular, the reception frame synchronization signal RX_SYNC is applied to a FFT unit 248 to be the reference signal for operating the internal memory. Here, in the case in which phase errors occur when receiving data, the phase errors are calculated in the DSP 160. The calculated phase errors are transmitted to the frame synchronization generator 200 and then the frame synchronization generator 200 delays the reception frame synchronization signal RX_SYNC and outputs the signal. Thus, the DMT processor 120 can accurately receive externally generated data without error.

The transmitter 220 of FIG. 2 DMT modulates and gain-controls data, which is applied from an input terminal IN1, in response to a transmission frame synchronization signal TX_SYNC and outputs the data through an output terminal OUT1. Here, the input terminal IN1 refers to a terminal through which data is input from the digital interface 110. Furthermore, the output terminal OUT1 refers to a terminal through which data is output from the DMT processor 120 to the analog front end processor 130. To this end, the transmitter 220 includes an input bit buffer 222, a QAM encoder 224, a transmission gain controller 226, a protocol signal generator 228, a multiplexer 230, an IFFT unit 232, a peak controller 234, and a transmission digital filter 236.

More specifically, the input bit buffer 222 stores input data bits applied from the digital interface 110 through the input terminal IN1. In this case, the data applied from the digital interface 110 corresponds to bits to be transmitted per frame, which are determined in a modem initialization process. Here, data that is transmitted from the CO's modem to the RT's modem is defined as downstream, and data that is transmitted from the RT's modem to the CO's modem is defined as upstream. The downstream and upstream data are different in data transfer speed and in the number of sub-channels in the transmission band. For example, assuming that the number of sub-channels within the data transmission band for downstream is N, the number of bits assigned to each of N sub-channels is determined during a modem initialization process.

The QAM encoder 224 of the transmitter 220 receives data stored in the input bit buffer 222, performs QAM encoding on the data, and produces the number N of complex sample data depending on the encoding result. That is, the QAM encoder 224 assigns data stored in the input bit buffer 222 to each of N sub-channels by 2–15 bits. Thus, data of 2–15 bits assigned to each sub-channel is QAM encoded. Here, the N complex samples refer to signals in the frequency domain. The transmission gain controller 226 receives N complex samples produced by the QAM encoder 224 and controls a transmission output level for each sub-channel. In this case, the controlled output level may change depending on the status of each sub-channel. The protocol signal generator 228 receives command signals COM applied from the DSP 160 and generates protocol signals PRO required for a modem initialization process. The protocol signal generator 228 will be described below with reference to FIG. 6. The multiplexer 230 selectively outputs the output signal of the transmission gain controller 226 or the output signal PRO of the protocol signal generator 228 in response to a transmission selection signal TX_SEL applied from the DSP 160 (See FIG. 1). In other words, the multiplexer 230 outputs the protocol signal PRO by the transmission selection signal TX_SEL, when the ADSL modem is initialized. The multiplexer 230 further outputs the number N of complex sample data that are gain-controlled by the transmission gain controller 226 when actually sending data.

The IFFT unit 232 performs IFFT on the complex samples in the frequency domain, output from the multiplexer 230, and converts them into samples in the time domain. In this case, the complex samples for N sub-channels in the frequency domain are converted to 2N samples in the time domain. The IFFT unit 232 will be described below with reference to FIG. 5. The peak controller 234 receives the output signal of the IFFT unit 232 and controls the peak level thereof. That is, when a signal output from the DMT processor 120 through the output terminal OUT1 is applied to the analog front end processor 130 (see FIG. 1), the peak controller 234 reduces the peak level of the output signal of the IFFT unit 232 in order to prevent the peak level from clipping in a D/A converter (not shown) within the analog front end processor 130.

The transmission digital filter 236 oversamples the output signal of the peak controller 234 so as to avoid aliasing that may occur during D/A conversion of the analog front end processor 130. Furthermore, the transmission digital filter 236 separates the data transmission band into a downstream band and an upstream band.

Meanwhile, the receiver 240 of FIG. 2 DMT demodulates and gain-controls data, which is applied from an input terminal IN2, in response to a reception frame synchronization signal RX_SYNC, and outputs the demodulated result through an output terminal OUT2. Here, the input terminal IN2 refers to a terminal through which data is input from the analog front end processor 130. Furthermore, the output terminal OUT2 denotes a terminal through which data is output from the DMT processor 120 to the digital interface 110. To this end, the receiver 240 includes a reception digital filter 254, a reception gain controller 252, a time domain equalizer 250, a FFT unit 248, a frequency domain equalizer 246, a QAM decoder 244, and an output bit buffer 242.

More specifically, the reception digital filter 254 downsamples the input data applied through the input terminal IN2 from an A/D converter (not shown) of the analog front end processor 130. Here, the number of data elements of the downsampled data may be 2N in the time domain. The reception gain controller 252 receives the data downsampled in the reception digital filter 254 and gain-controls the downsampled data. Although not shown in detail, the reception gain controller 252 calculates the average transmission output level of the received signal and sends the result to the DSP 160. Thus, the DSP 160 sends the result output from the reception gain controller 252 to the A/D converter of the analog front end processor 130 and controls the gain of the received analog signal.

The time domain equalizer 250 receives the signal gain-controlled by the reception gain controller 252 and equalizes the gain-controlled signal in the time domain, thereby shortening the channel response length. The FFT 248 converts 2N samples in the time domain to N complex samples in the frequency domain performing FFT in response to the reception frame synchronization signal RX_SYNC. The frequency domain equalizer 246 corrects the amplitudes and phases of the complex samples in the frequency domain output from the FFT unit 248 for each sub-channel.

The QAM decoder 244 receives the samples in which the amplitudes and phases are corrected by the frequency domain equalizer 246 and performs QAM decoding on the samples. In this case, data output from the frequency domain equalizer 246 by the result of QAM decoding is converted into data of 2–15 bits for each sub-channel. The output bit buffer 242 stores 2–15 bits of data output from the QAM decoder 244 for each sub-channel. In this case, data corresponding to the number of bits transmitted per frame is transmitted from the output bit buffer 242 to the digital interface 110 through the output terminal OUT2.

Although not shown in detail, the internal blocks of the transmitter 220 and the receiver 240 operate in response to the transmission frame synchronization signal TX_SYNC and the reception frame synchronization signal RX_SYNC generated by the frame synchronization signal generator 200, respectively.

In the DMT processor 120 having the structure as described above, data transmission and data reception are made after the ADSL modem is initialized. That is, the protocol signal generator 228 generates a random sequence and a tone signal by a DSP command COM in the course of initializing the ADSL modem and generates a protocol signal PRO by the random sequence and the tone signal. In this case, the multiplexer 230 selects and outputs the protocol signal PRO output from the protocol signal generator 228 in response to a transmission selection signal TX_SEL. The protocol signal PRO is subject to IFFT in the IFFT unit 232, and the result is output through the peak controller 234 and the transmission digital filter 236. When the initialization of the ADSL modem 15 is complete through the above process, transmission and reception of actual data are made.

Figure 3:
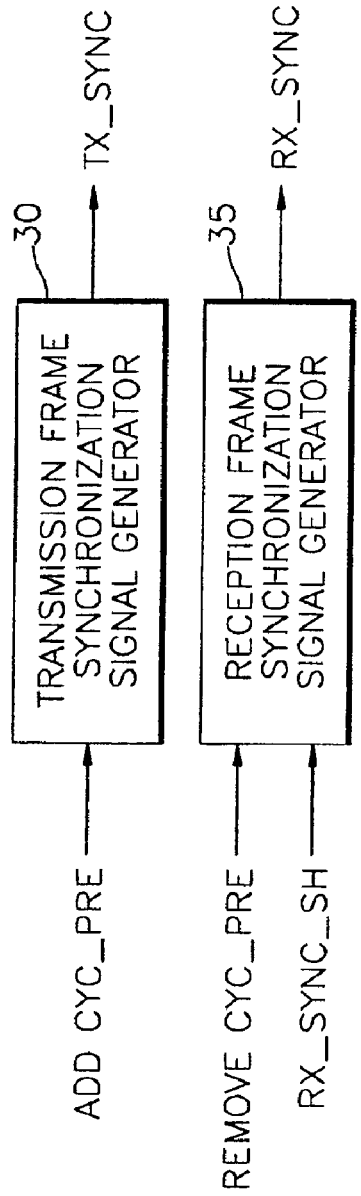
FIG. 3 is a block diagram of the frame synchronization signal generator of the processor shown in FIG. 2.

Referring to FIG. 3, which is a block diagram for explaining the frame synchronization signal generator 200 shown in FIG. 2, the frame synchronization signal generator 200 includes a transmission frame synchronization signal generator 30 and a reception frame synchronization signal generator 35. The transmission frame synchronization signal generator 30 adds a cyclic prefix CYC_PRE to transmission data transmitted in each data frame and generates a transmission frame synchronization signal TX_SYNC. The reception frame synchronization signal generator 35 removes the cyclic prefix CYC_PRE from reception data received in each data frame and generates a reception frame synchronization signal RX_SYNC in response to a reception synchronization shift signal RX_SYNC_SH applied from the DSP chip 160. Here, the cyclic prefix CYC_PRE refers to dummy data for reducing interference between data transmitted in each data frame. Furthermore, the reception synchronization shift signal RX_SYNC_SH represents a value for determining the number of samples by which the reception frame synchronization signal RX_SYNC is delayed.

Figure 4:
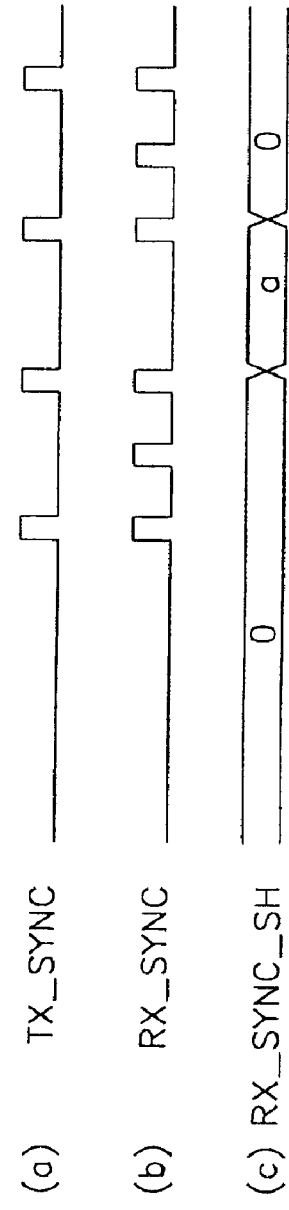
FIGS. 4A–4C are timing diagrams illustrating the operation of the circuit shown in FIG. 3.

FIGS. 4A–4C are waveforms for explaining the operation of the frame synchronization signal generator 200 shown in FIG. 3. FIGS. 4A–4C show the transmission frame synchronization signal TX_SYNC, the reception frame synchronization signal RX_SYNC, and the reception synchronization shift signal RX_SYNC_SH, respectively. That is, the transmission frame synchronization signal TX_SYNC is generated at regular intervals by adding the cyclic prefix to one frame data. However, referring to FIG. 4B, the reception frame synchronization signal RX_SYNC is delayed by a predetermined time period due to the reception synchronization shift signal RX_SYNC_SH shown in FIG. 4C. Referring to FIG. 4C, it is assumed that the reception synchronization shift signal RX_SYNC_SH, i.e., the number of samples to be shifted, is a. Therefore, the frame synchronization signal generator 200 delays a synchronization signal by a time corresponding to the number a of samples to be shifted. A point in time at which the reception frame synchronization signal RX_SYNC is generated is controlled in this way so as to correct signals phase-distorted by several factors that occur in the course of receiving data. In particular, phase distortion is seriously problematic in data reception. The phase distortion is first corrected in PLL included in the analog front end processor 130 and then completely corrected by the frame synchronization signal generator 200.

The frame synchronization method implemented by controlling the frame synchronization as described above can be compared with a conventional frame synchronization method. For the frame synchronization, the conventional method uses the order of reading data from a memory buffer having a two-frame size. However, the conventional method has a disadvantage in that the overall size of a circuit is increased due to use of the two-frame sized memory buffer. Thus, the present invention controls a frame synchronization signal by the reception synchronization shift signal RX_SYNC_SH transmitted from the DSP 160 for the frame synchronization instead of using the memory buffer.

Figure 5:
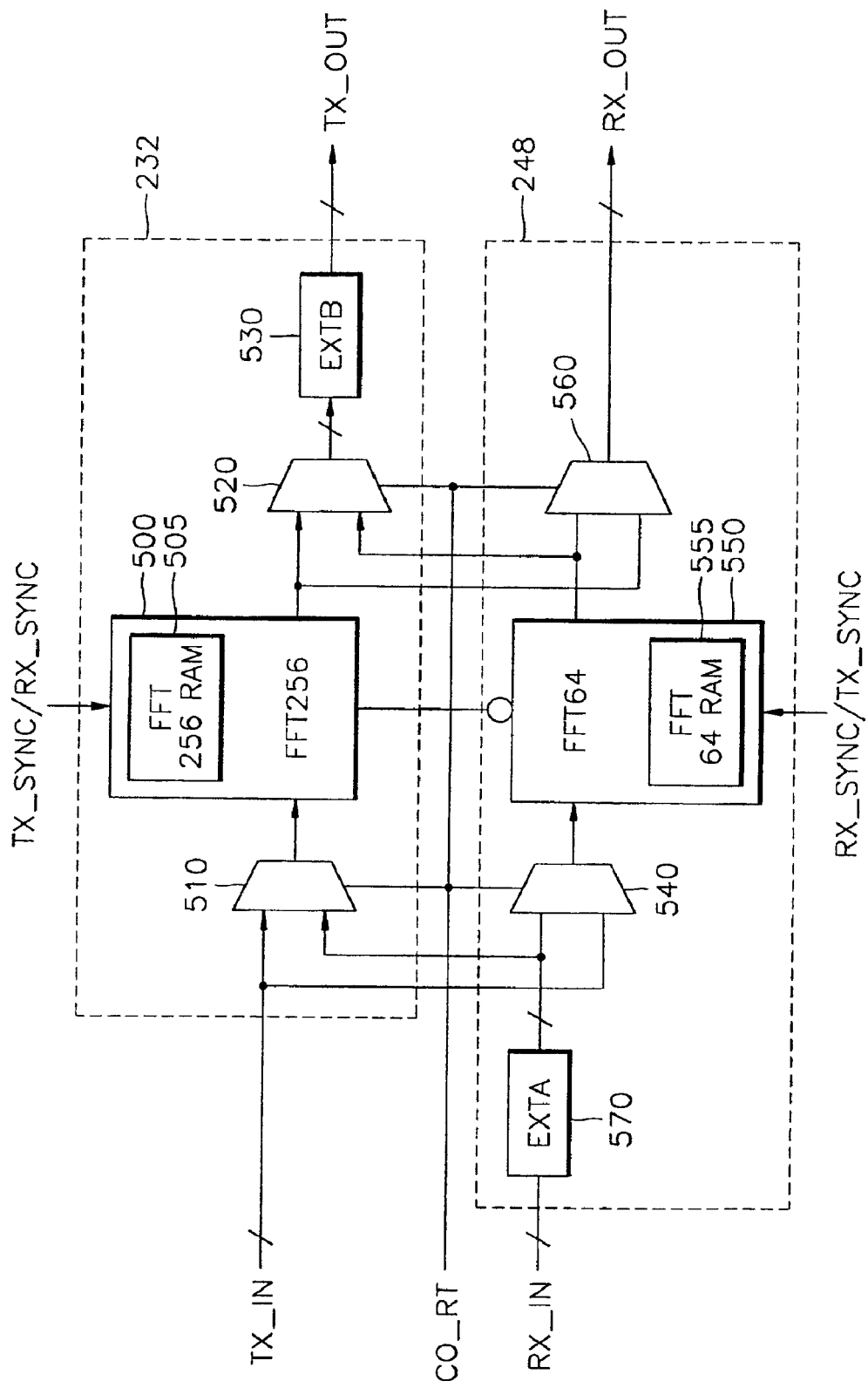
FIG. 5 is a detailed circuit diagram illustrating the fast Fourier transform (FFT) block of the processor shown in FIG. 2.

FIG. 5 is a detailed circuit diagram showing the IFFT unit 232 and the FFT unit 248 of the processor of FIG. 2. Referring to FIG. 5, the IFFT unit 232 includes a FFT256 unit 500, multiplexers 510 and 520, and an extension unit (EXTB) 530. Here, the IFFT unit 232 and the FFT unit 248 can be implemented within one FFT block.

More specifically, the multiplexer 510 in the IFFT unit 232 selectively outputs transmission data TX_IN or expanded reception data RX_IN in response to a modem selection signal CO_RT. The FFT256 unit 500 is provided with FFT256 RAM 505 for storing 256 points of data. The FFT256 unit 500 stores the complex sample data output from the multiplexer 510 in the FFT256 RAM 505 and performs IFFT on the stored data to generate time-domain sample data. Here, the modem selection signal CO_RT is set as a first level in the case of a CO's modem, and set as a second level in the case of an RT's modem. The multiplexer 520 selectively outputs the output signal of the FFT256 unit 500 or the output signal of a FFT64 unit 550 in response to the modem selection signal CO_RT. The EXTB 530 extends the output signal of the multiplexer 520 to a predetermined number of bits and outputs the extended bits of data as transmission data TX_OUT. In this case, the transmission data TX_OUT refers to data output to the peak controller 234 of FIG. 2. Furthermore, the FFT256 unit 500 operates synchronized with the transmission frame synchronization signal TX_SYNC or reception frame synchronization signal RX_SYNC, according to the modem selection signal CO_RT.

Here, the IFFT unit 232 may operate as the FFT unit 248 depending on whether it is installed in the CO's modem or RT's modem. That is, in the case where the DMT processor 120 according to the present invention is applied to the CO's modem, a 256 point IFFT and a 64-point FFT are used. Also, in the case where the DMT processor 120 according to the present invention is applied to the RT's modem, a 256-point FFT and a 64-point IFFT are used. Thus, the FFT unit 248 may operate as the IFFT unit 232 or vice versa depending on whether the DMT processor 120 is applied to the CO's modem or RT's modem.

An extension unit EXTA 570 of the FFT unit 248 shown in FIG. 5 receives reception data RX_IN, extends the number of bits and outputs the extended data. A multiplexer 540 selectively outputs the output signal of the EXTA 570 or transmission data TX_IN in response to the modem selection signal CO_RT. The FFT64 unit 550 stores a time-domain sample data output from the multiplexer 540 in a FFT64 RAM 555, and transforms the stored data into the complex sample data in the frequency domain, performing FFT. A multiplexer 560 selectively outputs the output signal of the FFT64 unit 550 or the FFT256 unit 500 as reception data RX_OUT in response to the modem selection signal CO_RT. Here, the reception data RX_OUT refers to data applied to the frequency domain equalizer 246 of FIG. 2.

As described above, an asymmetric memory structure is applied to the IFFT unit 232 and the FFT unit 248 of the DMT processor 120 according to the present invention, respectively. Thus, the size of a memory used in FFT blocks for transmission and reception, i.e., IFFT unit 232 and IFFT unit 248, can be minimized.

Figure 6:
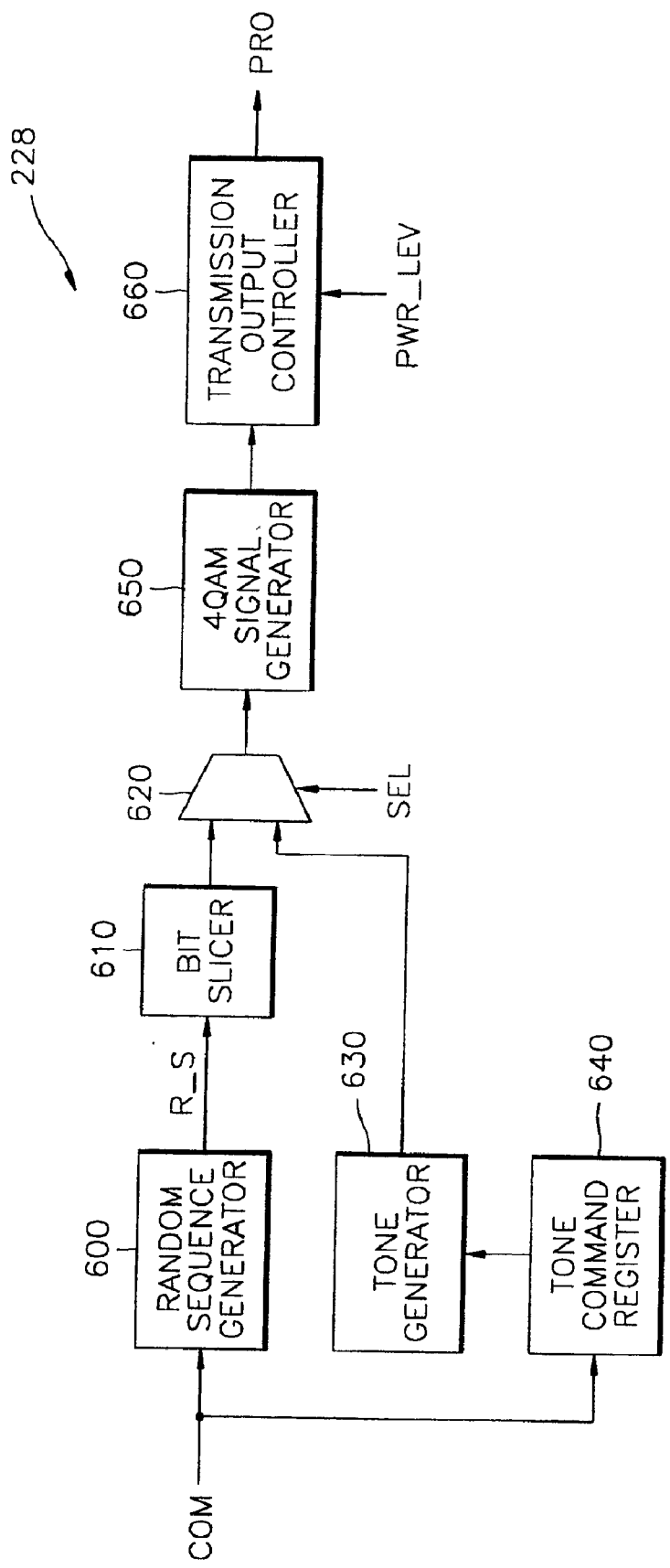
FIG. 6 is a block diagram of the protocol signal generator of the processor shown in FIG. 2.
Figure 7:
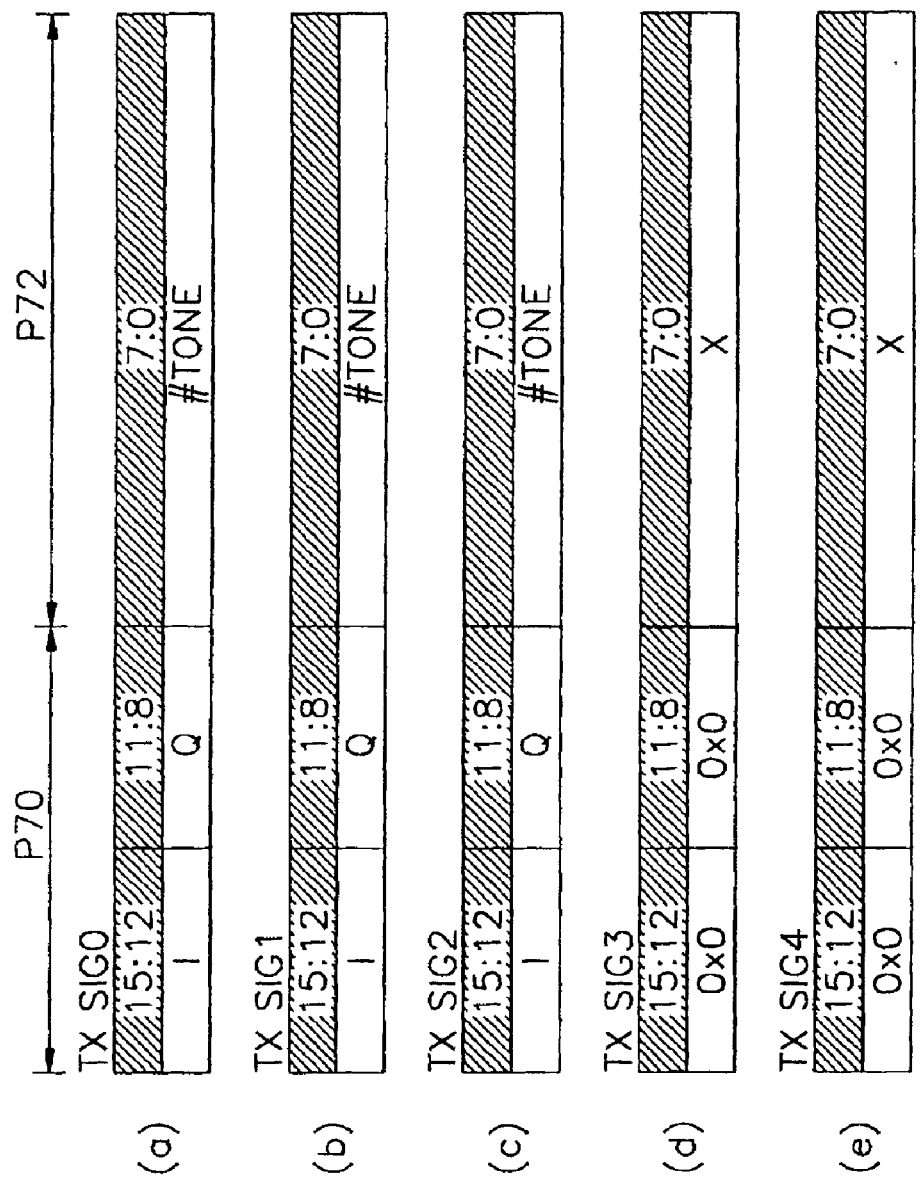
FIGS. 7A–7E illustrate the structure of commands applied to the protocol signal generator of FIG. 6.

FIG. 6 is a detailed block diagram showing the protocol signal generator 228 of the DMT processor 120 shown in FIG. 2. Referring to FIG. 6, the protocol signal generator 228 includes a random sequence generator 600, a bit slicer 610, a multiplexer 620, a 4QAM signal generator 650, a tone generator 630, a tone command register 640, and a transmission output controller 660.

The random sequence generator 600 generates a random sequence R_S that conforms to an ADSL standard in response to a DSP command COM applied from the DSP 160 (See FIG. 1). Here, the random sequence R_S is defined as test data arbitrarily transmitted through all sub-channels, for example, through all 256 sub-channels. The tone command register 640 stores a tone command among the command signal COM applied from the DSP 160. The tone generator 630 generates a tone signal TONE from the tone command stored in the tone command register 640. Here, the tone signal TONE is defined as test data transmitted through sub-channels designated among 256 sub-channels.

The bit slicer 610 receives the random sequence R_S applied from the random sequence generator 600 and slices the sequence in units of a predetermined number of bits. The present invention is implemented such that the random sequence R_S generated by the random sequence generator 600 is sliced in units of two bits.

The multiplexer 620 selectively outputs the bit-sliced random sequence R_S output from the bit slicer 610 or the output signal TONE of the tone generator 630 in response to a selection signal SEL applied from the DSP 160. The 4QAM signal generator 650 performs 4-QAM encoding on the signal output from the multiplexer 620, and outputs the encoded signal as complex data. Here, when transmitting the tone signal TONE, the present invention is implemented in such a way as to transmit up to 5 tone signals through designated sub-channels. The transmission output controller 660 adjusts the output level of a protocol signal PRO in response to a transmission output level signal PWR_LEV output from the DSP 160. In other words, as described above, the protocol signal is produced by combination of the random sequence and the tone signal TONE.

For communications between the ADSL modems, analysis on the type of modem and status of transmission channels is required during initialization. Thus, before data communication is actually made, it is determined whether each modem is prepared for data transmission by exchanging previously appointed protocol signals.

FIGS. 7A–7E illustrate the field structure of a DSP command applied to the protocol signal generator 228 of FIG. 6 when three tone signals TONE are simultaneously transmitted. Referring to FIG. 7, upper 8 bits, i.e., bits [15:8] among 16-bit command field of $0^{th}$ to $15^{th}$ bits indicate a field P70 designating the phase of a tone. The phase designation field is divided into two parts: upper bits [15:12] and the lower bits [11:8] which respectively indicates complex values I and Q. The remaining lower 8 bits [7:0] P72 are indicative of a sub-channel number through which the tone is transmitted. All five tone signals from TX_SIG0 to TX_SIG4 can be transmitted through the designated sub-channels. However, FIGS. 7A–7E show an example in which three tone signals are transmitted, so empty regions exist in FIGS. 7D and 7E.

The DMT processor according to the present invention is separated from the DSP and designed only for performing a DMT function, thereby reducing the overall size of the ADSL modem. Use of a low price and low speed DSP can also reduce the unit cost of a modem. Furthermore, the DMT processor according to the present invention uses an asymmetric memory and a simple frame synchronization signal generating circuit in FFT units for data transmission and reception, thereby minimizing the overall size of memory in the system.

While this invention has been particularly shown and described with references to a preferred embodiment thereof, the illustrated embodiment is only an example, and it will be understood by those skilled in the art that various changes in form and details may be made therein without departing from the spirit and scope of the invention as defined in the appended claims.

What is claimed is:

1. A discrete multi-tone (DMT) processor that receives predetermined control signals from a digital signal processor (DSP) in an asymmetric digital subscriber line (ADSL) modem, modulates transmission data in response to the control signals, and demodulates reception data, the DMT processor comprising:

a frame synchronization signal generator that generates a transmission frame synchronization signal and a reception frame synchronization signal in response to a cyclic prefix contained in the transmission data or the reception data, and in response to a reception synchronization shift signal provided by the DSP;

a protocol signal generator that receives a predetermined command signal from the DSP and generates a protocol signal for initializing communication of the transmission data;

a transmitter that DMT modulates and gain-controls the transmission data input through a first input terminal in response to the transmission frame synchronization signal and outputs the modulated and gain-controlled result through a first output terminal; and a receiver that gain-controls and DMT demodulates the reception data applied through a second input terminal in response to the reception frame synchronization signal and outputs the demodulated and gain-controlled result through a second output terminal.

2. The DMT processor of claim 1, wherein the frame synchronization signal generator comprises:

a transmission frame synchronization signal generator that generates the transmission frame synchronization signal by adding the cyclic prefix to the transmission data transmitted in each data frame; and a reception frame synchronization signal generator that generates a reception frame synchronization signal by removing the cyclic prefix from the reception data received in each data frame and delays the reception frame synchronization signal corresponding to the reception synchronization shift signal if a phase error occurs.

3. The DMT processor of claim 1, wherein the transmitter includes the protocol signal generator and further comprises:

a quadrature amplitude modulation (QAM) encoder that assigns data received from an external source to each of a plurality of sub-channels in units of a predetermined number of bits, performs QAM encoding on the data and produces a plurality of complex sample data depending on the encoded result;

a transmission gain controller that gain-controls the plurality of complex sample data generated by the QAM encoder and outputs the gain-controlled complex sample data;

a first multiplexer that selectively outputs either the gain-controlled complex sample data or the protocol signal;

an inverse fast Fourier transform (IFFT) unit that performs IFFT on the output signal of the first multiplexer in response to the transmission frame synchronization signal and outputs the transformed data; and a peak controller that controls the peak level of the data output from the IFFT unit and outputs the controlled signal.

4. The DMT processor of claim 1, wherein the protocol signal generator comprises:

a random sequence generator that generates a random sequence transmitted through each sub-channel in response to the command;

a bit slicer that slices the random sequence output from the random sequence generator in units of a predetermined number of bits and outputs the sliced bits;

a tone generator that generates a tone signal transmitted through a designated sub-channel in response to the command;

a second multiplexer that receives the sliced bit signal and the tone signal and selectively outputs either of the received signals;

a QAM signal generator that performs QAM encoding on the output signal of the second multiplexer and outputs the encoded result; and a transmission output controller that controls the transmission output level of the signal output from the QAM signal generator and outputs a signal having the controlled transmission output level as the protocol signal.

5. The DMT processor of claim 4, wherein, in the protocol signal generator, the command is comprised of K-bit field area, where K>1, in which upper P-bit region of the command designates the phase of the tone signal, where 1<P<K, and a K-P bit region designates a sub-channel through which the tone signal is transmitted.

6. The DMT processor of claim 3, wherein the IFFT unit includes an N-bit RAM, stores the output signal of the first multiplexer selected by a modem selection signal in the N-bit RAM, and performs IFFT on the signal.

7. The DMT processor of claim 3, wherein the transmitter further comprises an input bit buffer that stores the transmission data input through the first input terminal and outputs the stored data to the QAM encoder.

8. The DMT processor of claim 3, wherein the transmitter further comprises a transmission digital filter that oversamples the signal output from the peak controller and outputs the oversampled result through the first output terminal.

9. The DMT processor of claim 1, wherein the receiver comprises:

a reception gain controller that calculates the average output level of externally received data and controls the gain of the received data in response to the calculated result;

a time domain equalizer that equalizes the output signal of the reception gain controller in time domain and outputs the equalized result;

an FFT unit that performs FFT on the output signal of the time domain equalizer in response to the reception frame synchronization signal and generates a plurality of complex samples in a frequency domain;

a frequency domain equalizer that frequency equalizes the frequency domain complex samples and corrects the amplitude and phase of the complex samples for each sub-channel; and a QAM decoder that performs QAM decoding on the output signal of the frequency domain equalizer and outputs the decoded signal.

10. The DMT processor of claim 9, wherein the FFT unit includes an M-bit RAM, stores the output signal of the time domain equalizer selected by a modem selection signal in the M-bit RAM, and performs a FFT on the signal.

11. The DMT processor of claim 9, wherein the receiver further comprises a reception digital filter that downsamples the reception data received through the second input terminal and outputs the downsampled result to the reception gain controller.

12. The DMT processor of claim 9, wherein the receiver further comprises an output bit buffer that stores a predetermined number of bits of data of each sub-channel output from the QAM decoder and transmits the stored data through the second output terminal in every frame.

13. In a discrete multi-tone (DMT) processor that discrete multi-tone modulates/demodulates transmission and reception data by control of a digital signal processor (DSP) provided within an asymmetric digital subscriber line (ADSL) modem, a protocol signal generator that generates a protocol signal for initializing the modem in response to a predetermined command applied from the DSP, the protocol signal generator comprising:

a random sequence generator that generates a random sequence transmitted through a plurality of sub-channels in response to the command;

a bit slicer that slices the random sequence in units of a predetermined number of bits and outputs the sliced bits;

a tone generator that generates a predetermined tone signal transmitted through a designated sub-channel in response to the command;

a multiplexer that receives the sliced bit signal and the tone signal and selectively outputs one of the received signals; and a quadrature amplitudemodulation (QAM) signal generator that performs QAM encoding on the output signal of the multiplexer and outputs the encoded result as the protocol signal.

14. The protocol signal generator of claim 13, further comprising a transmission output controller that controls a transmission output level of the protocol signal.

15. The protocol signal generator of claim 13, wherein the command is comprised of K-bit field area, where K>1, in which upper P-bit region of the command designates the phase of the tone signal where 1<P<K, and a K-P bit region designates a sub-channel through which the tone signal is transmitted.

16. A discrete multi-tone (DMT) processor that receives predetermined control signals from a digital signal processor (DSP) in an asymmetric digital subscriber line (ADSL) modem, modulates transmission data in response to the control signals, and demodulates reception data, the DMT processor comprising:

a frame synchronization signal generator that generates a transmission frame synchronization signal and a reception frame synchronization signal in response to a cyclic prefix contained in the transmission data or the reception data, and in response to a reception synchronization shift signal provided by the DSP; a protocol signal generator that receives a predetermined command signal from the DSP and generates a protocol signal for initializing communication of the transmission data;

a transmitter that DMT modulates and gain-controls the transmission data input through a first input terminal in response to the transmission frame synchronization signal and outputs the modulated and gain-controlled result through a first output terminal; and a receiver that gain-controls and DMT demodulates the reception data applied through a second input terminal in response to the reception frame synchronization signal and outputs the demodulated and gain-controlled result through a second output terminal;

wherein the frame synchronization signal generator comprises:

a transmission frame synchronization signal generator that generates the transmission frame synchronization signal by adding the cyclic prefix to the transmission data transmitted in each data frame; and a reception frame synchronization signal generator that generates a reception frame synchronization signal by removing the cyclic prefix from the reception data received in each data frame and delays the reception frame synchronization signal corresponding to the reception synchronization shift signal if a phase error occurs.

17. The DMT processor of claim 16, wherein the transmitter comprises:

a quadrature amplitude modulation (QAM) encoder that assigns data received from an external source to each of a plurality of sub-channels in units of a predetermined number of bits, performs QAM encoding on the data and produces a plurality of complex sample data depending on the encoded result;

a protocol signal generator that receives a predetermined command from the DSP and generates a protocol signal for initializing data communication;

a transmission gain controller that gain-controls the plurality of complex sample data generated by the QAM encoder and outputs the gain-controlled complex sample data;

a first multiplexer that selectively outputs either the gain-controlled complex sample data or the protocol signal;

an inverse fast Fourier transform (IFFT) unit that performs IFFT on the output signal of the first multiplexer in response to the transmission frame synchronization signal and outputs the transformed data; and a peak controller that controls the peak level of the data output from the IFFT unit and outputs the controlled signal.

18. The DMT processor of claim 17, wherein the protocol signal generator comprises:

a random sequence generator that generates a random sequence transmitted through each sub-channel in response to the command;

a bit slicer that slices the random sequence output from the random sequence generator in units of a predetermined number of bits and outputs the sliced bits;

a tone generator that generates a tone signal transmitted through a designated sub-channel in response to the command;

a second multiplexer that receives the sliced bit signal and the tone signal and selectively outputs either of the received signals;

a QAM signal generator that performs QAM encoding on the output signal of the second multiplexer and outputs the encoded result; and a transmission output controller that controls the transmission output level of the signal output from the QAM signal generator and outputs a signal having the controlled transmission output level as the protocol signal.

19. The DMT processor of claim 18, wherein, in the protocol signal generator, the command is comprised of K-bit field area, where K>1, in which upper P-bit region of the command designates the phase of the tone signal, where 1<P<K, and a K-P bit region designates a sub-channel through which the tone signal is transmitted.

20. The DMT processor of claim 17, wherein the IFFT unit includes an N-bit RAM, stores the output signal of the first multiplexer selected by a modem selection signal in the N-bit RAM, and performs IFFT on the signal.

21. The DMT processor of claim 17, wherein the transmitter further comprises an input bit buffer that stores the transmission data input through the first input terminal and outputs the stored data to the QAM encoder.

22. The DMT processor of claim 17, wherein the transmitter further comprises a transmission digital filter that oversamples the signal output from the peak controller and outputs the oversampled result through the first output terminal.

23. The DMT processor of claim 16, wherein the receiver comprises:

a reception gain controller that calculates the average output level of externally received data and controls the gain of the received data in response to the calculated result;

a time domain equalizer that equalizes the output signal of the reception gain controller in time domain and outputs the equalized result;

an FFT unit that performs FFT on the output signal of the time domain equalizer in response to the reception frame synchronization signal and generates a plurality of complex samples in a frequency domain;

a frequency domain equalizer that frequency equalizes the frequency domain complex samples and corrects the amplitude and phase of the complex samples for each sub-channel; and a QAM decoder that performs QAM decoding on the output signal of the frequency domain equalizer and outputs the decoded signal.

24. The DMT processor of claim 23, wherein the FFT unit includes an M-bit RAM, stores the output signal of the time domain equalizer selected by a modem selection signal in the M-bit RAM, and performs a FFT on the signal.

25. The DMT processor of claim 23, wherein the receiver further comprises a reception digital filter that downsamples the reception data received through the second input terminal and outputs the downsampled result to the reception gain controller.

26. The DMT processor of claim 23, wherein the receiver further comprises an output bit buffer that stores a predetermined number of bits of data of each sub-channel output from the QAM decoder and transmits the stored data through the second output terminal in every frame.

* * * * *